March 21, 1967 R. R. MELONE 3,310,326
RETAINER
Filed Nov. 19, 1964
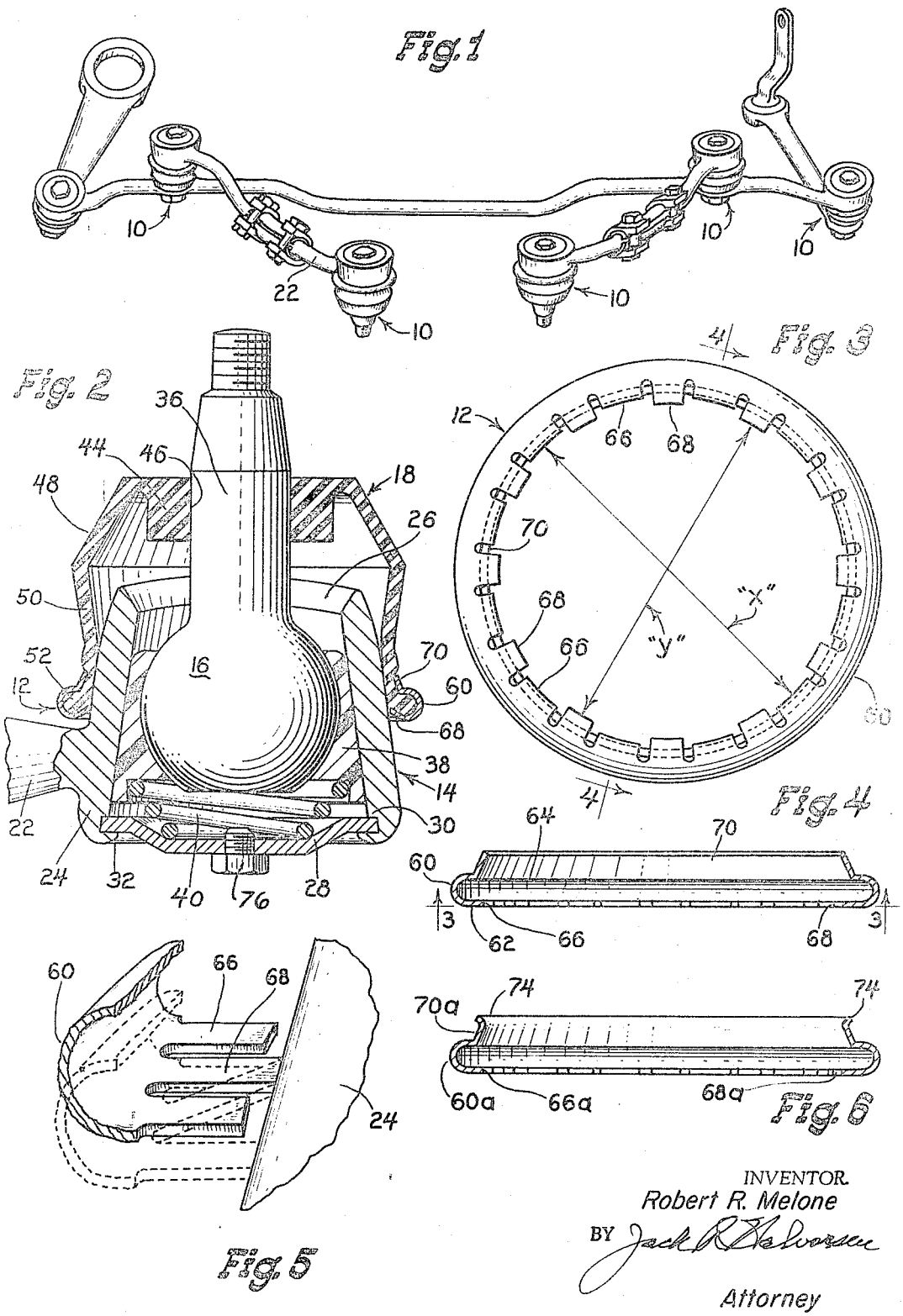
INVENTOR.
Robert R. Melone
BY Jack R. Halvorsen
Attorney

United States Patent Office 3,310,326
Patented Mar. 21, 1967

3,310,326
RETAINER
Robert R. Melone, Des Plaines, Ill., assignor to Illinois Tool Works Inc., Chicago, Ill., a corporation of Delaware
Filed Nov. 19, 1964, Ser. No. 412,472
4 Claims. (Cl. 287—87)

This invention relates to a retainer. More specifically, it relates to a sheet metal retainer for positioning a dust cover in fixed relationship to the exterior of the socket portion of a ball and socket joint.

Dust covers, or boots as they are called in the trade, have in the past been positioned on the socket portion of ball and socket joints by a plurality of methods. In some instances physical portions of the sockets have been spun over to retain the boot in position, and in other instances, the outer wall of the socket, which are mainly forged, have required a secondary machining operation to provide specific dimensions for the force fit acceptance of a retainer adapted to grippingly engage the boot relative to the socket wall.

An object of the present invention is to provide a simple one piece sheet metal retainer which will fasten itself relative to a forged socket and, at the same time, retain a dust cover or boot in fixed assembled relationship to said socket.

Another object of the present invention is to provide a retainer which will automatically position itself relative to a forged socket even though said socket has slight irregularities in the dimensional tolerances and will substantially always be positioned at the same axial point on a tapered socket wall.

Still another object of the invention is to provide a retainer which is simple in design, provides ease of assembly with a socket, positive engagement with the socket and is economical from an installation standpoint and is virtually a nonremovable retainer which cannot be removed without destruction of the part.

Further objects will be apparent from the description when taken in conjunction with the drawing wherein:

FIG. 1 is a perspective view of the general environment within which an embodiment of the invention can be utilized;

FIG. 2 is an elevational view in partial section of the assembly of a dust cover, a retainer, and ball and socket joint;

FIG. 3 is a plan view of a retainer as viewed from the bottom side;

FIG. 4 is an elevation in section of the embodiment shown in FIG. 3 and taken along lines 4—4 of FIG. 3;

FIG. 5 is a perspective view in partial section showing the interaction of the retainer forming an embodiment of the invention as it is applied to the socket wall and showing in phantom its final position; and FIG. 6 is a modification to the embodiment of the present invention.

Retainers of the type contemplated by the present invention may be utilized with ball and socket joint and boot assemblies generally indicated by the numeral 10. Such assemblies may be found in many areas, for example, in automotive steering linkage mechanisms of the type generally shown in FIG. 1. Such assemblies 10 when using the present invention would include a retainer 12, a socket 14, a ball 16 and a dust cover or boot 18.

As is well known in the art, the socket 14 is generally a metal forging having a rough exterior surface and including an arm 22 provided at one end with a hollow frusto-conical body 24 tapering toward its upper extremity. The interior is generally machine and provided with a chamfered opening 26 at its upper end. The opening at the lower end is closed by a plate 28 retained in position against the shoulder 30 by spinning over a lower lip 32.

Prior to the assembly of plate 28 with the body 24, the ball 16 with its associated neck 36 is telescopically assembled within a thermoplastic seat 38 and both ball 16 and seat 38 are telescoped within socket 14 and retained in seated relationship by spring 40 acting against plate 28. These elements are well known in the art.

The frusto-conical exterior surface wall of socket body 24 contains many irregularities since the socket is a forging. As was indicated above, it was necessary in the prior art to machine certain portions of the outer surface of the body 24 to provide the necessary close tolerances for retention of the boot 18 relative to the socket body 24. Such secondary operations to said socket body 24 are unnecessary with the present invention, as will be described hereinafter. The boot 18 is provided at its upper end with a bushing portion 44 having a central aperture 46 adapted to complementally accept the neck 36 of the ball. Extending outwardly and downwardly from bushing portion 44 is a first wall portion 48 which at its outermost extremity is joined to a second wall portion 50. Wall 50 extends inwardly and downwardly and terminates in a laterally extending bead 52. The internal diameter of wall 50 and bead 52 is equal to or less than the diametral extent of the outer wall of socket body 24 at a point determined by a plane passing perpendicular to its axis and axially spaced from opposite ends of said socket body 24. The dust cover or boot 18 is generally fabricated of molded rubber, neoprene or other suitable materials which are flexible and will accommodate the ball-stud action during the operation of the ball and socket joint. The main purpose, of course, is to prevent foreign materials from passing through the chamfered opening 26 which would interfere with the normal operation of the ball and socket joint.

Retainer 12 is preferably fabricated of resilient material, such as sheet metal and includes an annular body 60 channel-shaped in cross section which presents a cavity, opening inwardly in the illustrated embodiment, and provides a pair of axially spaced edges 62 and 64. The body 60 preferably has a semi-toroidal shape in section but may take any form, such as an open polygon, square, or rectangle, which should be complementary to and adapted to accept the bead 52 of the particular boot with which it is to be associated.

Extending radially inwardly from lower edge 62 are a plurality of teeth 66 and 68 spaced circumferentially about the retainer. The teeth are sequentially arranged to provide short teeth 66 and long teeth 68. Additionally the short teeth 66 are preferably provided with a greater circumferential extent than the long teeth 68 and hence, are more rigid. If desired, but not shown, short teeth 66 may be ribbed or otherwise strengthened to increase their rigidity relative to teeth 68. The diametral spacing between opposite short teeth, as indicated by the line designated X is substantially greater than the diametral extent between opposite long teeth 68, as indicated by the line Y, for purposes best set forth hereinafter.

Extending integrally from the upper edge 64 is supporting or gripping means 70. In the present instance, as shown in FIG. 4, gripping means 70 is preferably a continuous annulus which extends inwardly and upwardly. It may, if desired, be a plurality of individual members circumferentially spaced and extending from upper edge 64, or alternatively, but not shown, may extend parallel to or away from the socket body 24 to act as a support and limiting means for the movement of wall 50 of the boot during motion of the ball neck 36.

In some instances, after extensive wear on the thermoplastic seat 38, it is desirable to pack the socket with grease. To accomplish this, a tapped hole is provided in plate 28 which is normally closed by screw 76. Screw 76 may be removed and replaced with a standard grease fitting. To revent rupture of the boot 18 or seat 38 from excess grease pressure, it is desirable to provide means for the egress of excess grease. This may be accomplished by tolerance control of aperture 46 relative to neck 36 or by relieving the retainer body 60 as by circumferential slot means, not shown, or by elimination of a certain number of teeth 66–68, at circumferentially spaced points, to permit, in the latter two instances, movement of the bead 52 from its normally sealing engagement with socket body 24 and thereby provide points of egress for excess grease.

Retainer 12 is used as follows: The laterally extending bead 52 of boot 18 is complementally positioned within the semi-toroidal body 60 and the subassembly of boot 18 and the retainer 12 are telescopically assembled with the socket body 24 and ball neck 36. As best seen in FIG. 5, the telescopic association of retainer 12 with the tapered walls of socket body 24 first brings the long teeth 68 into engagement with the side wall. Continued axial movement of the retainer deflects tooth 68 upwardly until such time as the short rigid teeth 66 are brought into agreement with the socket body 24. The diametral spacing X of the short rigid teeth 66 is controlled so that it is substantially equal to the predetermined diametral extent of a given axial position along the outer surface of socket body 24. Short teeth 66 because of their rigid nature act as positioning teeth to position the retainer in the predetermined plane perpendicular to the axis of the socket. The length of long teeth 66 and their opposed diametral spacing Y are controlled in relation to the taper and diametral extent of the outer wall of socket body 24. This control results in the deflection of the long teeth 68 to a predetermined angularity whereby the teeth 68 are most effective as a spring grip member and so that the teeth 68 are not deflected beyond the point where they could possibly fracture.

In the referred embodiment illustrated, the inner diametral extent of the annular gripping means 70 is also controlled relative to the thickness of second wall portion 50 and the diametral extent of the tapered outer wall of socket body 24 at the particular axial point. With the teeth 68 in positive engagement with the side wall of socket body 24 the gripping means 70 preferably compresses the second wall portion 50 into engagement with the wall of socket body 24 and hence, provides an effective secondary seal from external environment. The primary seal at this location is of course, provided adjacent bead 52 with the deflection of teeth 68 aiding in the gripping of the material of the bead 52 captured by body 60.

A modification to the present invention is shown in FIG. 6 wherein similar parts are designated by similar numerals with the addition of the suffix a. In this embodiment, a semi-toroidal body 60a is provided along one edge with inwardly directed teeth 66a and 68a and with an annular gripping means 70a extending inwardly and upwardly from the upper edge of body 60a. Annular gripping means 70a in this embodiment is provided with a reversely bent portion 74 so as to afford a smooth surface in engagement with the resilient boot 18. Dependent upon the types of materials utilized in boot 18 and the degree of movement of the ball neck 36 occasionally a sharp edge will tend to tear or rip some types of material in use.

The retaining means illustrated by the embodiments herein can be fabricated economically from sheet metal and is preferably heat treated to provide spring characteristics thereto. It can be readily assembled with the bead 52 of the boot 18 and thence actually telescoped into positive seated position at a predetermined approximate location axially of the socket body 24. The device does not require any secondary operations to be performed on socket body 24 since the positioning teeth 66 will compensate for slight irregularities in tolerances in a forged socket and the gripping teeth 68 will positively retain the device in mounted position. The choice and number of positioning teeth 66 and gripping teeth 68 is dependent upon the particular part with which the device is associated. In the present embodiment the gripping and positioning teeth are shown as being alternately positioned about the circumference of the part and extend radially from edge 62. All the teeth may, if desired, be present to a selected attitude with the extremities of the longer teeth always having a diametral spacing less than their final spacing when gripping the socket. In other examples, not shown, the user may employ any combinations of tooth location desired so long as there are at least three positioning teeth circumferentially spaced about the inner periphery of the retainer.

Other forms and modifications will be apparent to those skilled in the art and it is my intent that I be restricted solely by the appended claims.

I claim:

1. A one piece sheet metal retainer adapted to retain a compressible flexible member having an annular bead at one extremity in association with a predetermined axial location on the outer periphery of a tapered workpiece, said retainer including a continuous annular channel shaped body having a pair of annular edges spaced along the central axis of said retainer with each edge facing radially inwardly towards said axis and said workpiece, a plurality of circumferentially spaced integral resilient teeth about one of said edges initially extending radially inwardly toward said axis, flange means extending integrally from the other edge and along said axis and away from said teeth diametrically opposed pairs of said teeth being diametrally spaced a predetermined distance less than the diametrical size of said predetermined location on said workpiece whereby said teeth are adapted to flex in the direction of said second edge during application to said workpiece an amount less than that necessary to fracture said teeth and yet permit them to be seated and bite into said workpiece at said predetermined location, said teeth further being adapted when flexed to aggressively grip said annular bead within said channel shaped body.

2. A device of the type claimed in claim 1 wherein said flange means has a predetermined diametral extent larger than the diameter of said workpiece at a location axially spaced from said predetermined location but equal to or less than the sum of the diametral thickness of said workpiece and said flexible member at said location whereby said flange means is adapted to compressibly grip said flexible member into intimate engagement with said workpiece.

3. A device of the type claimed in claim 1 wherein said teeth have a plurality of differing diametral extents circumferentially spaced about the retainer, some of said teeth being radially shorter than others with the diametral extent of diametrically opposed pairs of said radially shorter teeth being substantially equal to the diameter of said predetermined location, said radially shorter teeth having a greater circumferential extent than said longer flexible teeth whereby said retainer when axially telescoped with said tapered workpiece will first cause the longer teeth to readily axially deflect and said shorter teeth because of their greater circumferential extent will be more rigid and not deflect there by assuring positioning of said flexible member and said retainer at the predetermined axial location on said workpiece.

4. A fastener assembly of a ball joint socket having a tapered external wall generally frusto-conical in shape, a flexible boot adapted to embrace said tapered external wall and extend axially outwardly from said socket, said flexible boot having an annular bead adjacent one end embracing said socket and sheet metal retainer means securing said flexible boot in fixed relation to said socket at a preselected position axially of said socket, said retainer means including a channel shaped body curvilinear in transverse section and opening radially inwardly to complementally accept the annular bead and an adjacent portion of the wall of said flexible boot, said retainer body having a pair of axially spaced inner margins facing toward said socket, a plurality of teeth extending radially inwardly to differing extents from one of said margins so as to present long and short teeth, said short teeth each having a greater circumferential extent and being substantially more rigid than said long teeth, the free terminal ends of said short teeth falling on a circle which is substantially equal to the diametral measurement of said socket at said preselected axial position of a plane passing transversely through said socket and perpendicular to the axis of said socket, the free terminal ends of said long teeth falling on a circle which is substantially smaller than the diametral measurement of said socket at said preselected axial position, said long teeth being resilient enough so as to be flexed upwardly and bite into said socket as the retainer is axially telescoped on said socket member to the preselected axial position where the short teeth are brought into contact with said socket, the radial extent of the long teeth being preselected in relation to the diametral measurement of said socket at said preselected axial position so that said long teeth are deflected in their finally mounted position to an extent below that deflection where they could fracture, integral gripping means extending radially inwardly from the second of said margins and axially upwardly away from said teeth to compress the wall of said flexible boot into sealing engagement with the wall of said socket.

References Cited by the Examiner
UNITED STATES PATENTS

| | | | |
|---|---|---|---|
| 2,712,262 | 7/1955 | Knohl | 85—36 |
| 2,890,416 | 6/1959 | Walker | 85—36 X |
| 3,021,157 | 2/1962 | Moskovitz | 287—90 |
| 3,208,290 | 9/1965 | Mathues et al. | 287—90 X |
| 3,226,142 | 12/1965 | Herbenar | 287—87 |
| 3,239,259 | 3/1966 | Dance et al. | 287—87 |

CARL W. TOMLIN, *Primary Examiner.*

THOMAS F. CALLAGHAN, *Examiner.*

A. V. KUNDRAT, *Assistant Examiner.*